US007011043B2

(12) United States Patent
Diep

(10) Patent No.: US 7,011,043 B2
(45) Date of Patent: Mar. 14, 2006

(54) APPARATUS, SYSTEMS AND METHODS FOR DULLING ANIMAL CLAWS

(76) Inventor: Michael Diep, 1075 Bellevue Way NE., #433, Bellevue, WA (US) 98004

(*) Notice: Subject to any disclaimer, the term of this patent is extended or adjusted under 35 U.S.C. 154(b) by 0 days.

(21) Appl. No.: 10/751,206

(22) Filed: Jan. 2, 2004

(65) Prior Publication Data

US 2004/0139926 A1 Jul. 22, 2004

Related U.S. Application Data

(60) Provisional application No. 60/472,444, filed on May 20, 2003, provisional application No. 60/437,908, filed on Jan. 2, 2003.

(51) Int. Cl.
*A01K 13/00* (2006.01)

(52) U.S. Cl. ...................................... 119/601; 119/706

(58) Field of Classification Search ................ 119/601, 119/702, 706, 165, 600
See application file for complete search history.

(56) References Cited

U.S. PATENT DOCUMENTS 3,486,485 A * 12/1969 Kahanick .................... 119/706
3,993,027 A * 11/1976 Mullin ....................... 119/706
4,996,946 A * 3/1991 Olson ......................... 119/706
5,269,261 A * 12/1993 McCance .................... 119/706
5,275,181 A * 1/1994 Rudolph, Jr. ............. 132/76.4
5,564,365 A 10/1996 Kacic
5,842,440 A * 12/1998 Bell, Jr. ...................... 119/621
5,875,737 A * 3/1999 Boshears .................... 119/706
5,924,383 A * 7/1999 Smith ......................... 119/165
6,205,955 B1 3/2001 Diep

FOREIGN PATENT DOCUMENTS

JP 11018609 A * 1/1999
JP 02003180188 A * 7/2003

OTHER PUBLICATIONS

Cosmic Pet Products, Alpine Scratchers, Oct. 19, 2000, www.cosmicpet.com/scratchers.htm□□.*
Worldwise Inc., Cat Scratcher, Aug. 30, 2001, www.worldwise.com/widbodcatscr.html, discloses that Cat Scratcher and Certified Organic Catnip were introduced 6 years prior.*

* cited by examiner

*Primary Examiner*—Yvonne R. Abbott

(57) ABSTRACT

Apparatus and assemblies for dulling animal claws using corrugated material and abrasive surfaces. An animal, such as cat, will instinctively claw at the corrugated material and contact the abrasive surfaces, thereby simultaneously dulling or trimming its claws. Methods are also provided to dull animal claws, including inducing the animal to claw at the corrugated material with an organic substance.

18 Claims, 22 Drawing Sheets

APPARATUS, SYSTEMS AND METHODS FOR DULLING ANIMAL CLAWS

CROSS-REFERENCE TO RELATED APPLICATIONS

This application claims the benefits of U.S. Provisional Patent Application No. 60/472,444 filed May 20, 2003 and U.S. Provisional Patent Application No. 60/437,908 filed Jan. 2, 2003, both of which are incorporated herein by reference in their entireties.

TECHNICAL FIELD

The present invention relates to apparatus, systems and methods for dulling animal claws.

BRIEF SUMMARY OF THE INVENTION

In some embodiments of the present invention, a corrugated bundle is coupled to a dulling element having an abrasive surface. The corrugated bundle has at least two liner walls and at least one rippled sheet or flute. The liner walls are substantially planar and parallel to one another with the rippled sheet disposed therebetween and coupled to faces of the liner walls. When an animal, such as a cat, instinctively claws or scratches at the corrugated bundle, its claws can contact the abrasive surface of the dulling element thereby dulling or trimming the animal's claws.

In another embodiment of the present invention, the liner walls and rippled sheet of the corrugated bundle comprise abrasive faces. In such embodiments, the dulling element may or may not be provided as the abrasive faces are capable of dulling the animal claws without the dulling element being coupled to the corrugated bundle.

Various embodiments of the present invention also include holders of various configurations for retaining the corrugated bundles.

Other embodiments of the present invention relate to methods for dulling or trimming animal claws. Corrugated bundles are provided, as well as abrasive surfaces or faces either formed on the liner sheets or rippled sheets of the corrugated bundles or on a surface of a dulling element attached thereto. In addition, organic substances can be provided to induce the animals to scratch the corrugated bundles.

DETAILED DESCRIPTION OF VARIOUS EMBODIMENTS OF THE INVENTION

In the following description, certain specific details are set forth in order to provide a thorough understanding of various embodiments of the invention. However, upon reviewing this disclosure one skilled in the art will understand that the invention may be practiced without many of these details. In other instances, well-known structures associated with vacuums, motions sensors, and processors have not been described in detail to avoid unnecessarily obscuring the descriptions of the embodiments of the invention.

The discussion below discloses cardboard as a material comprising some of the illustrated embodiments of the invention. However, as well be understood by one skilled in the art after reviewing this disclosure, any of a number of materials could be suitable and are contemplated herein including, but not limited to, a variety of well-known plastic or fabrics. Also, the discussion below is applicable to house cats as well as other animals having claws.

Terms in the following description related to orientation such as "below" and "above," "bottom" and "top," "left" and "right," "up" and "down," and "vertical" and "horizontal," are only intended to describe the position or orientation of elements in relation to the figures in which they are illustrated. Unless the context indicates otherwise, these terms of orientation are not intended to be restrictive in meaning outside of describing the orientation of a particular element relative to the subject illustration.

Figure 1:
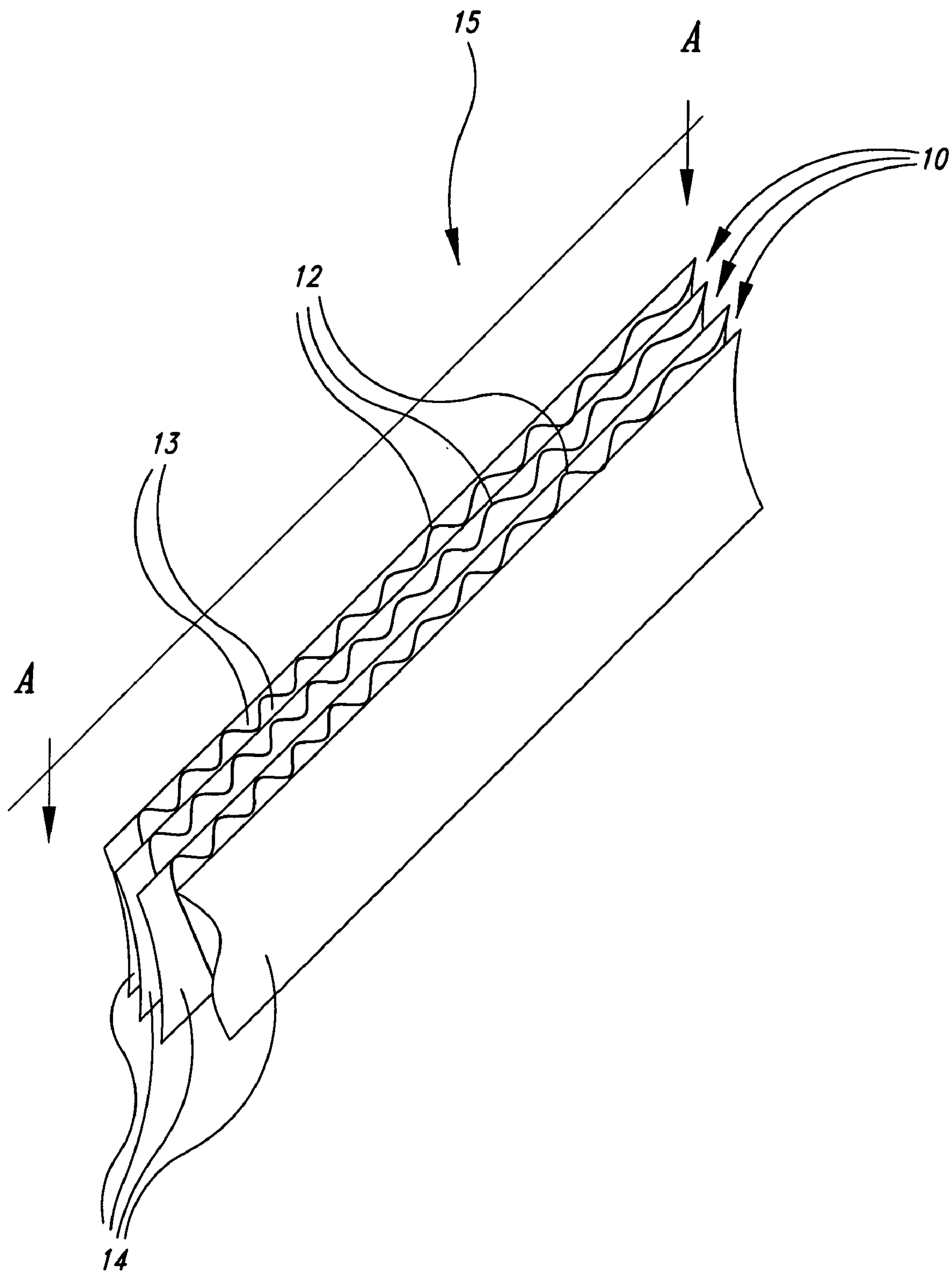
FIG. 1 is a perspective view of a portion of a corrugated bundle comprising several corrugated strips used with a variety of embodiments of the present invention.
Figure 2:
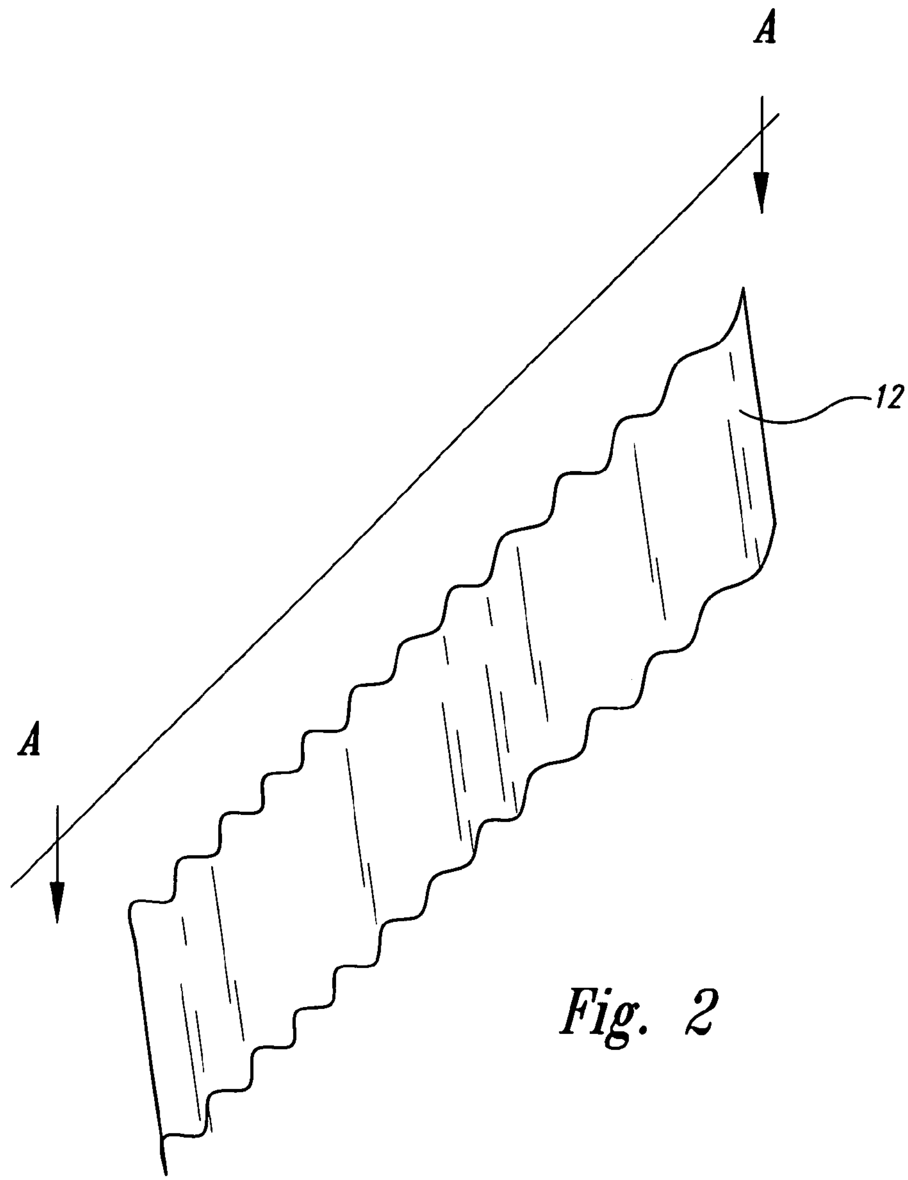
FIG. 2 is a perspective view of one of the rippled sheets of FIG. 1.

Some embodiments of the present invention comprise strips of corrugated material, or corrugated strips 10, as illustrated in FIG. 1 and FIG. 2. Each of the corrugated strips 10 can comprise at least one liner wall 14 and a rippled sheet 12 (fluting) coupled thereto. Any number of the corrugated strips 10 can be coupled together in parallel fashion to form a corrugated bundle 15 that comprises an alternating arrangement of rippled sheets 12 and liner walls 14, as can be seen in FIG. 1.

Larger corrugated bundles 15 made of cardboard and generally comprising ten or more corrugated strips, have been found to be useful as scratching pads or toys for cats. Cats will sometimes instinctively claw such corrugated bundles (which are sometimes call cardboard scratchers), thereby distracting them away from the tendency they may have to damage other household items, such as furniture and carpet. In addition, catnip is commonly sprinkled into vertical channels 13 of such corrugated bundles 15, the vertical channels 13 (see FIG. 1) being defined by surfaces of the rippled sheets 12 and liner walls 14. The sprinkled catnip can further attract cats to claw the corrugated bundles 15.

Figure 4:
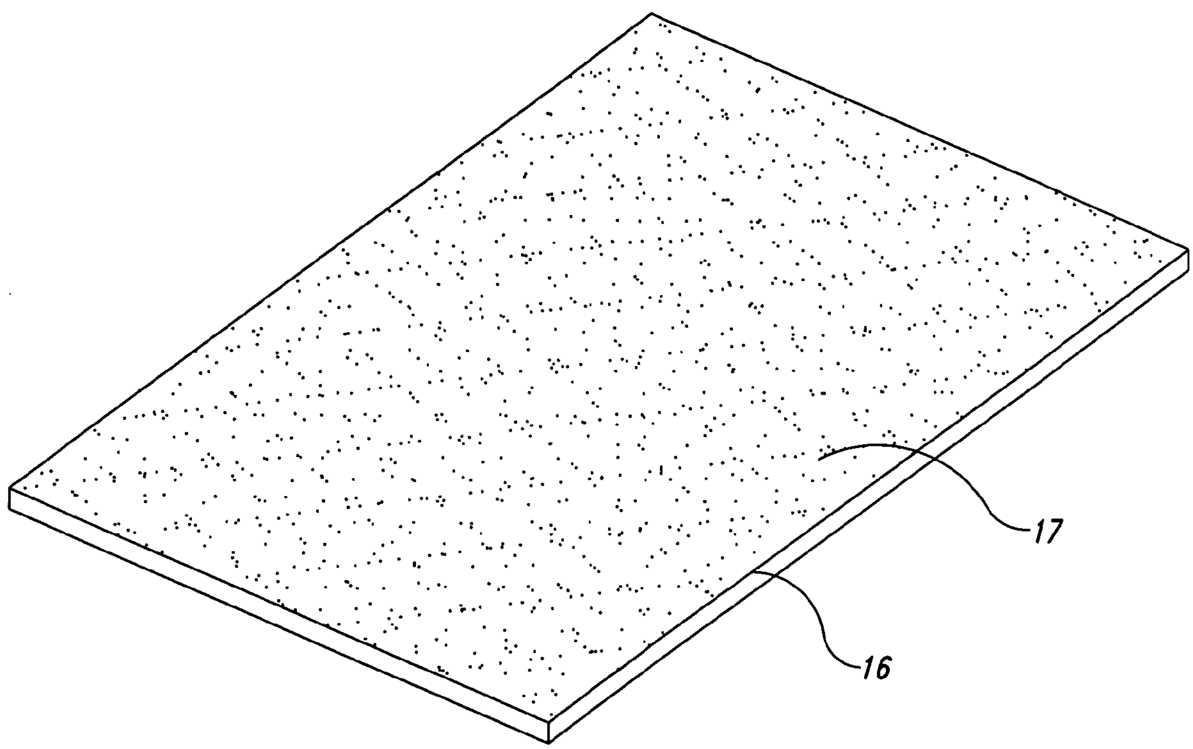
FIG. 4 is a perspective view of a dulling element of an embodiment of the present invention.

In some embodiments of the present invention, a corrugated bundle 15 is disposed over a dulling element 16, such as sand paper, to form a corrugated assembly 19. See FIG. 4 and FIG. 5. The dulling element 16 of the corrugated assembly 19 can have an abrasive surface 17 that can mate against edges of the liner walls 14 of the corrugated bundle 15. More specifically, in the illustrated embodiment of FIG. 5, the abrasive surface 17 mates against first longitudinal edges 18 of the liner walls 14 and rippled sheets 12. In addition, in certain embodiments, a reinforcement member 16' can be coupled to a bottom surface of the dulling element 16, opposite the abrasive surface 17. The reinforcement member 16' can contribute to the rigidity of the corrugated assembly 19. The reinforcement member 16', like many other structures described herein, can be a variety of shapes, but is rectangular in the illustrated embodiment to match the shape of the illustrated dulling element 16. It is further noted that in some embodiments, the individual parts of the corrugated assembly 19 (e.g. corrugated bundle 15, dulling element 16, and reinforcement member 16') can be fixedly coupled together using any of a variety of well-known bonding substances, while in other embodiments, the individual components are separable. In yet further embodiments, two of components (e.g. the dulling element 16 and the reinforcement member 16') may be fixedly coupled together while another component (e.g. the corrugated bundle 15) can be separable.

Figure 5:
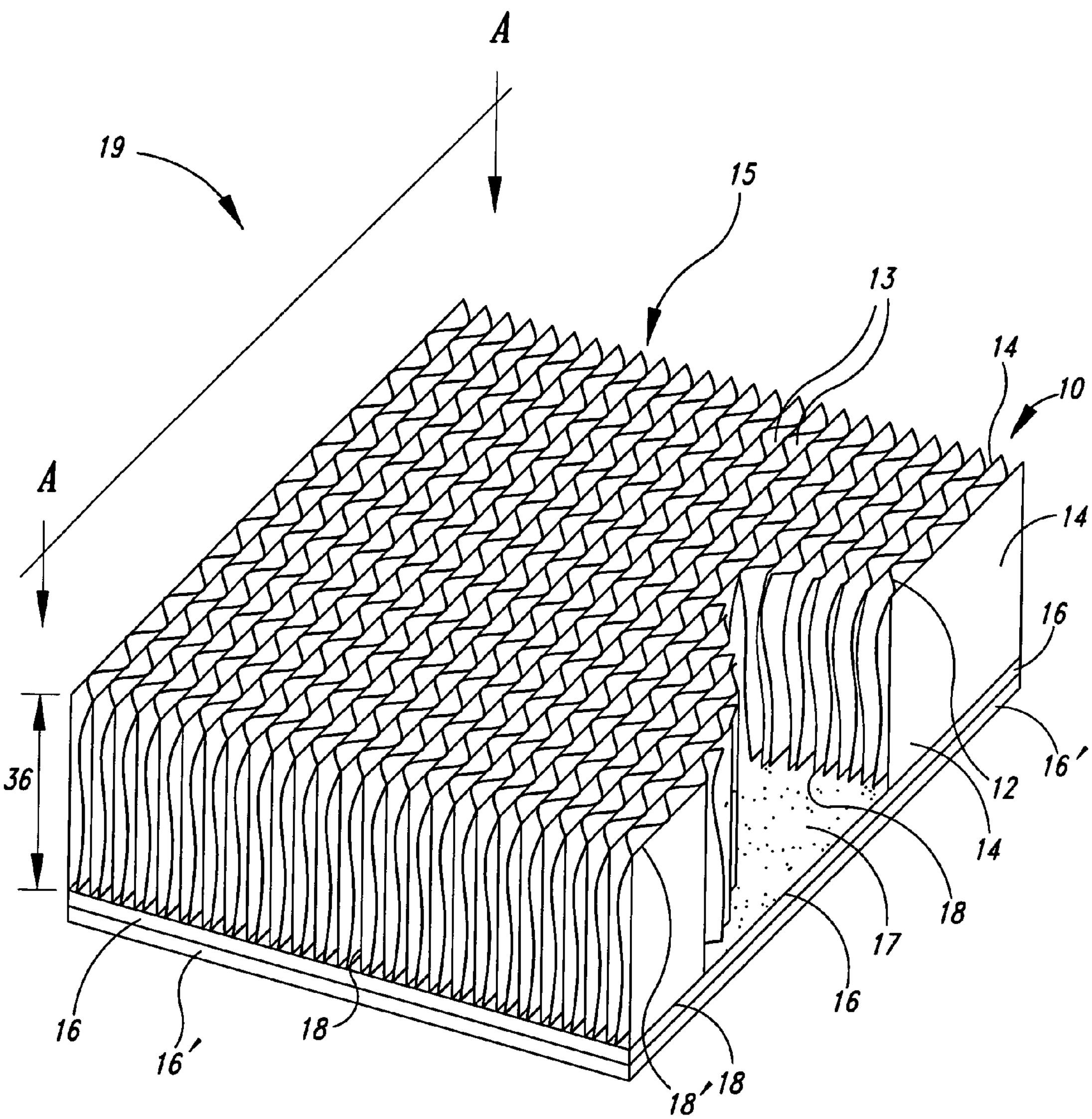
FIG. 5 is a cutaway perspective view of a corrugated bundle disposed over the dulling element of FIG. 4, with the cutaway portion exposing the abrasive surface of the dulling element.

In some embodiments, when a cat claws the corrugated bundle 15 of the corrugated assembly in FIG. 5, its claws will extend through the vertical channels 13, or tear through at least a portion of the rippled sheet 12 or liner walls 14, contacting the abrasive surface 17 and thereby simultaneously trimming or dulling the cat's claws. This trimming or dulling can be enhanced by optimizing the depth 36 (i.e. the distance between the first longitudinal edges 18 second longitudinal edges 18' thereof) of the corrugated bundle 15. Without being bound by theory, it is noted that as the depth 36 is decreased, a cat's claws may more easily extend through the corrugated bundle 15 to contact the abrasive surface 17 disposed below. However, a sufficiently large enough depth 36 may sometimes need to be maintained to provide longevity to the corrugated assembly 19 such that it does not get quickly worn away by a cat's claws, and to provide adequate cushion between the soft surfaces of a cat's paws and the abrasive surface 17. The optimal depth may vary with the size of a cat (i.e. the power it exerts), and the length and size of its claws. Accordingly, in some embodiments of the invention, a chart of available and recommended depths 36 are provided to a cat owner, the chart being usable to cross reference size characteristics of the owner's cat with a recommended depth 36.

In certain embodiments, the depth 36 of the corrugated bundle 15 is about ¼ inch to about ½ inch. In other embodiments, the depth 36 can be about 1 inch. In still further embodiments, the depth 36 can be less than about ¼ inch, between about ⅛ and about 1 inch, or greater than about ¾ inch.

Figure 8:
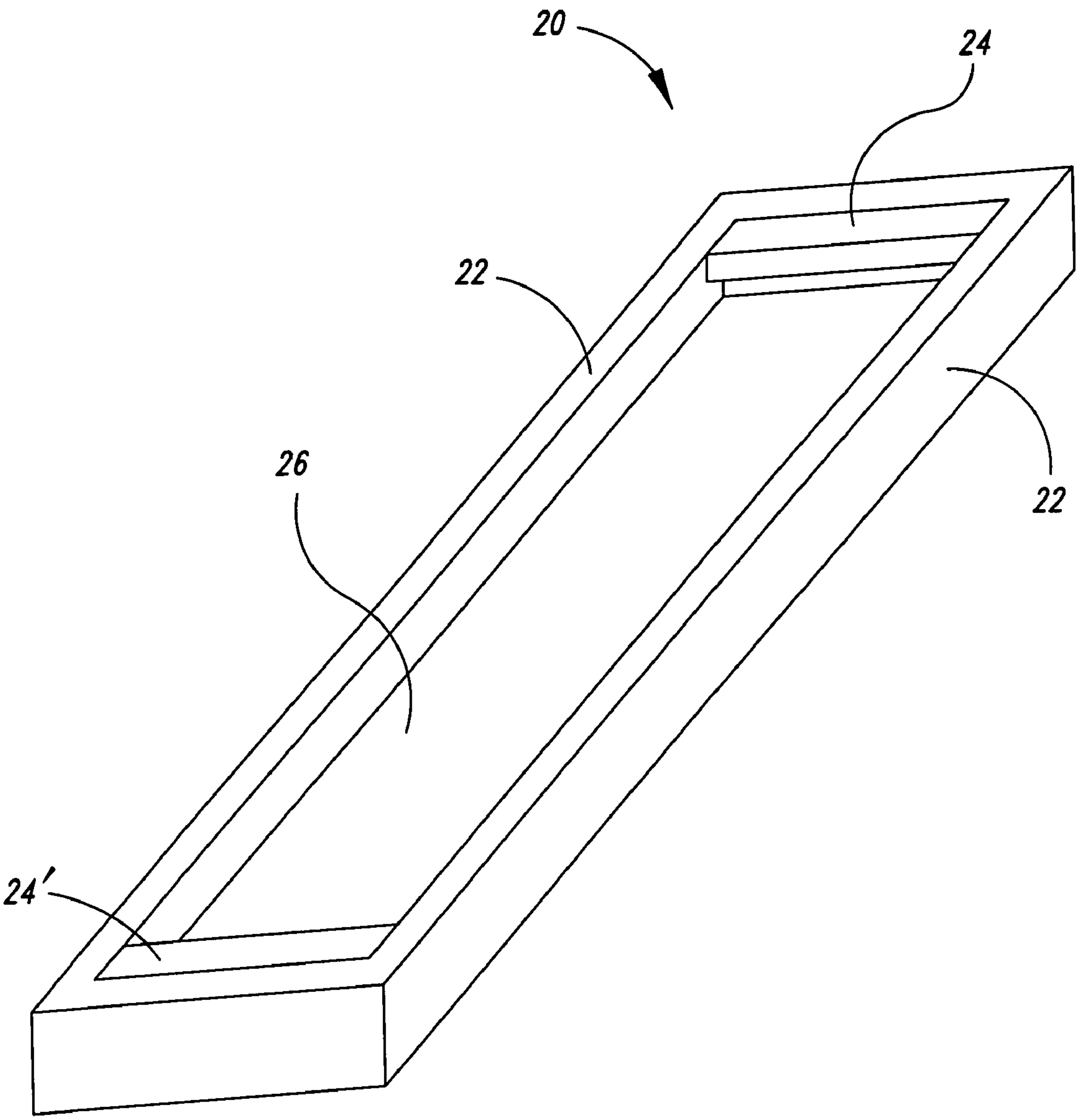
FIG. 8 is a perspective view of a holder embodiment of the present invention having a bottom wall and coupling walls extending outward away from the bottom wall.

Various embodiments of the corrugated assembly 19 are disposable within a holder 20, such as that shown in FIG. 8. The holder 20 can have a bottom wall 26 against which the dulling element 16 can be placed with the abrasive surface 17 facing upward, as shown in FIG. 9.

The holder 20 can have a coupling wall 22 that extends upward away from the bottom wall 26 and surrounds a perimeter of the holder 20. When the corrugated assembly 19 is disposed within the holder 20, it can mate against the coupling wall 22 to prevent longitudinal or lateral movement of the corrugated assembly within the holder 20.

Figure 9:
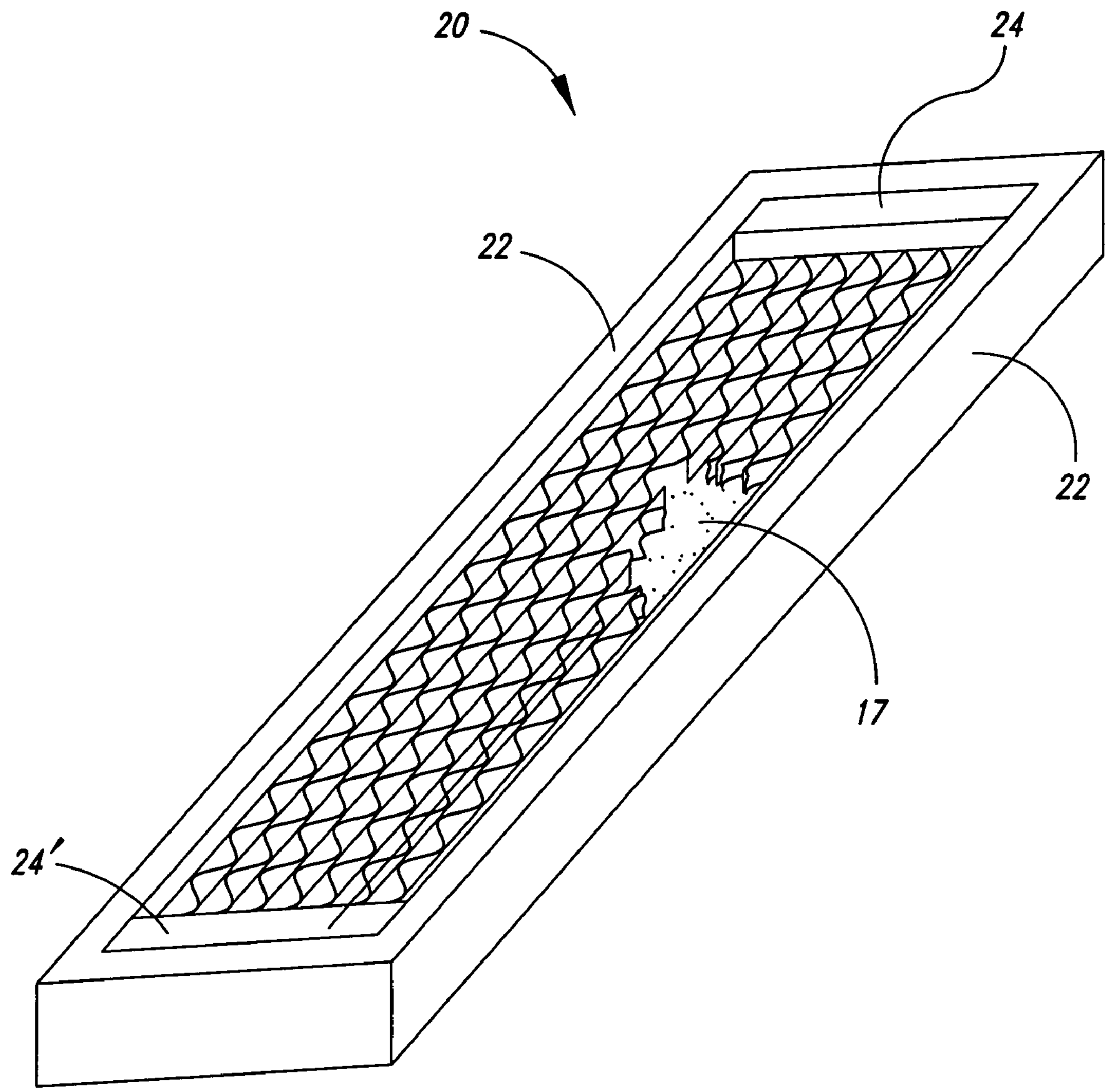
FIG. 9 is a perspective cutaway view of the holder of FIG. 8 with an embodiment of the corrugated bundle of FIG. 5 disposed within the holder. The cutaway view exposes the abrasive surface of a dulling element disposed beneath the corrugated bundle between the bottom wall of the holder and the corrugated bundle.

In addition, the holder can have retainers 24 and 24', as best seen in FIG. 8 and FIG. 9. An inward, or bottom facing surface of the retainers 24 and 24' can mate against an upward facing portion of the corrugated assembly 19 (See FIG. 9) to secure the assembly and prevent upward, or transverse movement of the corrugated assembly 19 away from the holder 20. At least one of the retainers 24, 24' can be configured to be pivotable with respect to the holder 20 (See FIG. 12). The arrow "a" shows a pivoting direction of the retainer 24 in FIG. 12. In some embodiments of the present invention, the corrugated assembly 19 may be rigid, such that insertion thereof into the holder 20 may required that the retainer 24 first be pivoted away to provide clearance for the corrugated assembly 19. Thereafter, the retainer 24 may be pivoted back to mate a bottom surface thereof against the corrugated assembly 19 to secure the assembly within the holder 20.

Figure 11:
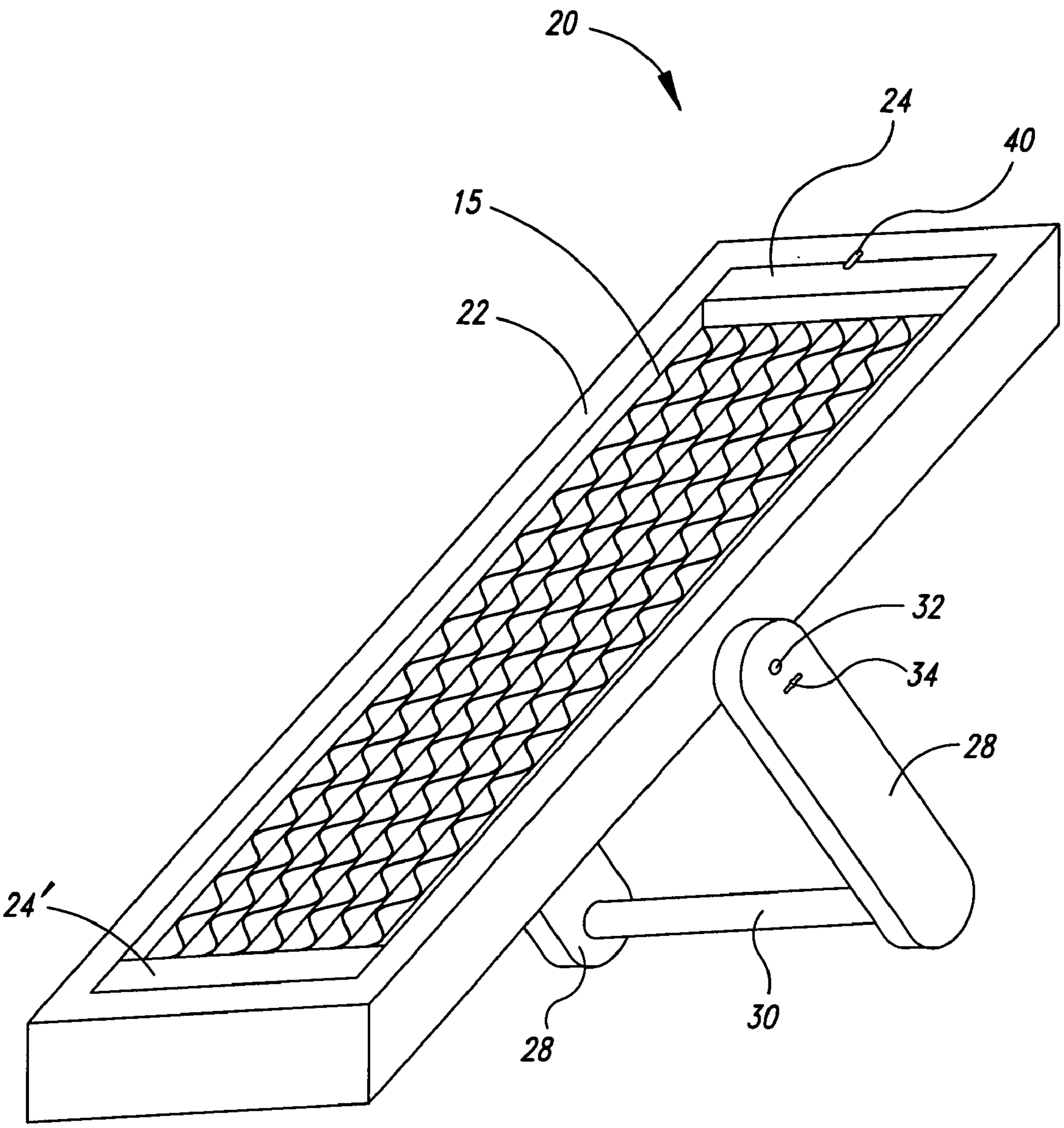
FIG. 11 is a perspective view of the holder of FIG. 10A with an embodiment of the corrugated bundle of FIG. 5 disposed within the holder.
Figure 12:
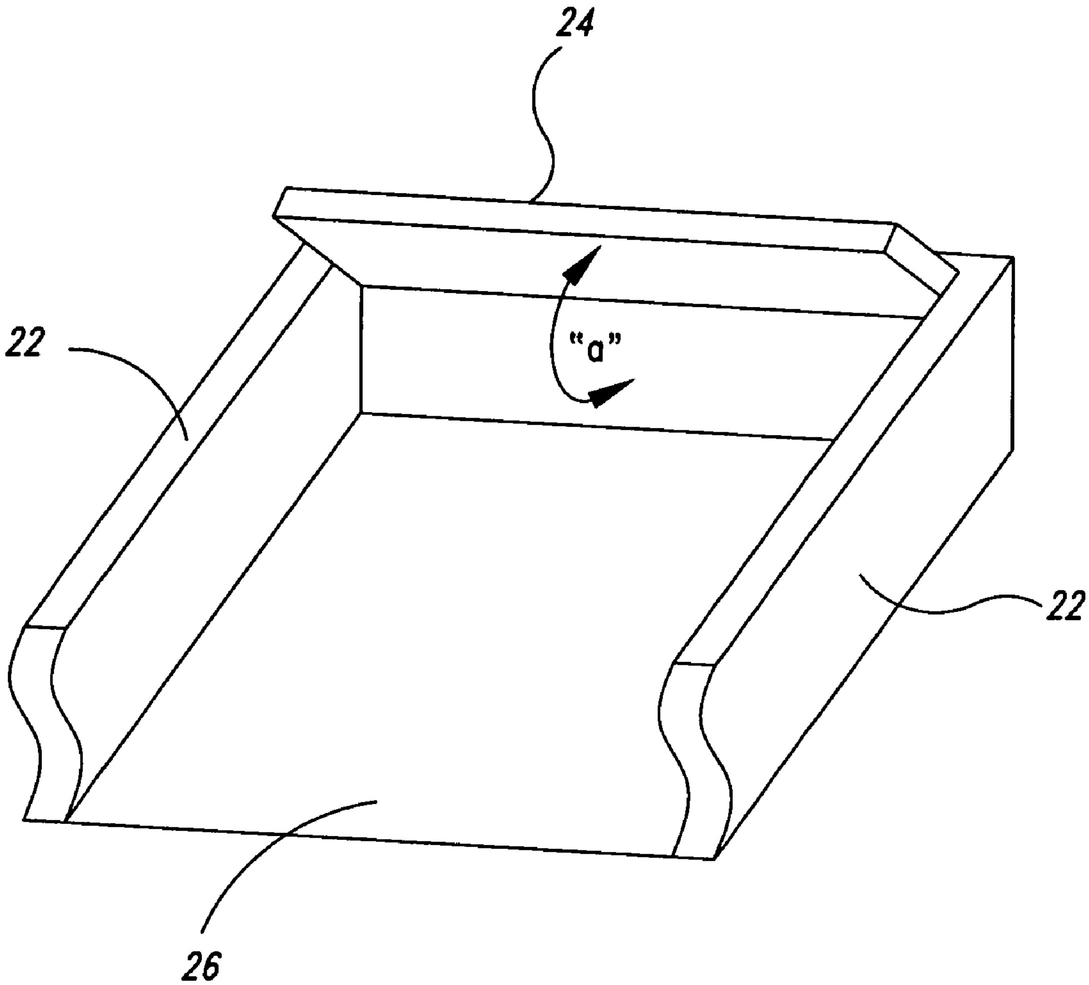
FIG. 12 is a detail perspective view of an end portion of the holder of FIG. 8 with a retainer of the holder being positioned in an upward position such that a corrugated bundle and dulling element can be loaded within the holder.

The retainer 24 may also have a locking element. As well be appreciated by one skilled in the art after reviewing this disclosure, various known devices may be employed in unique combination with the present invention as locking elements to secure a selectable position of the retainer 24. For example, the locking element may comprise a swivel lever 40 that can be positioned to be over the retainer 24 to lock it in place over the corrugated assembly (FIG. 11), or swiveled away to allow a portion of the retainer to be lifted away from the corrugated assembly 19 so that is can be released (FIG. 12).

Figure 10A:
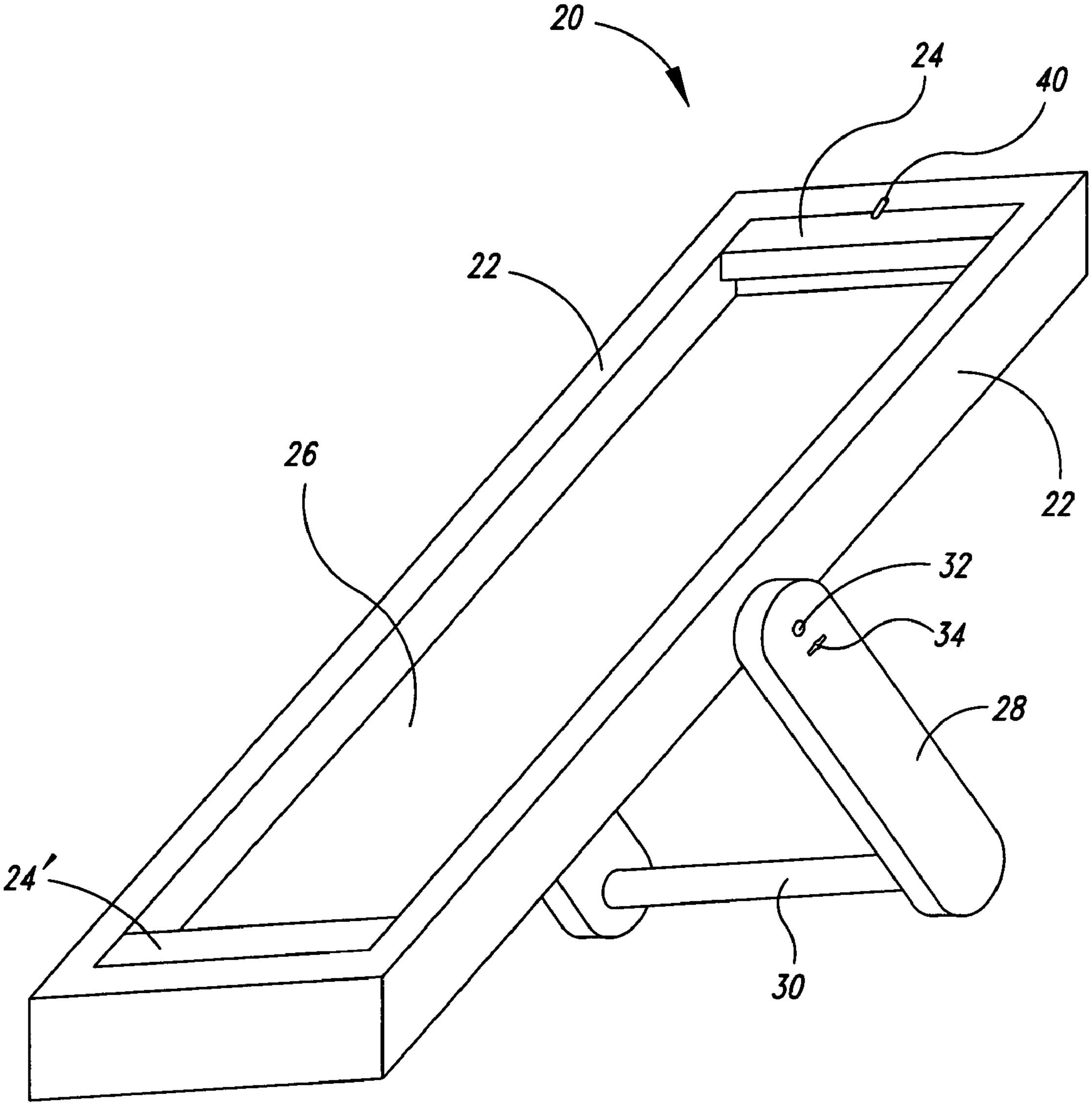
FIG. 10A shows the holder of FIG. 8 having an embodiment of the support members of the present invention.
Figure 10B:
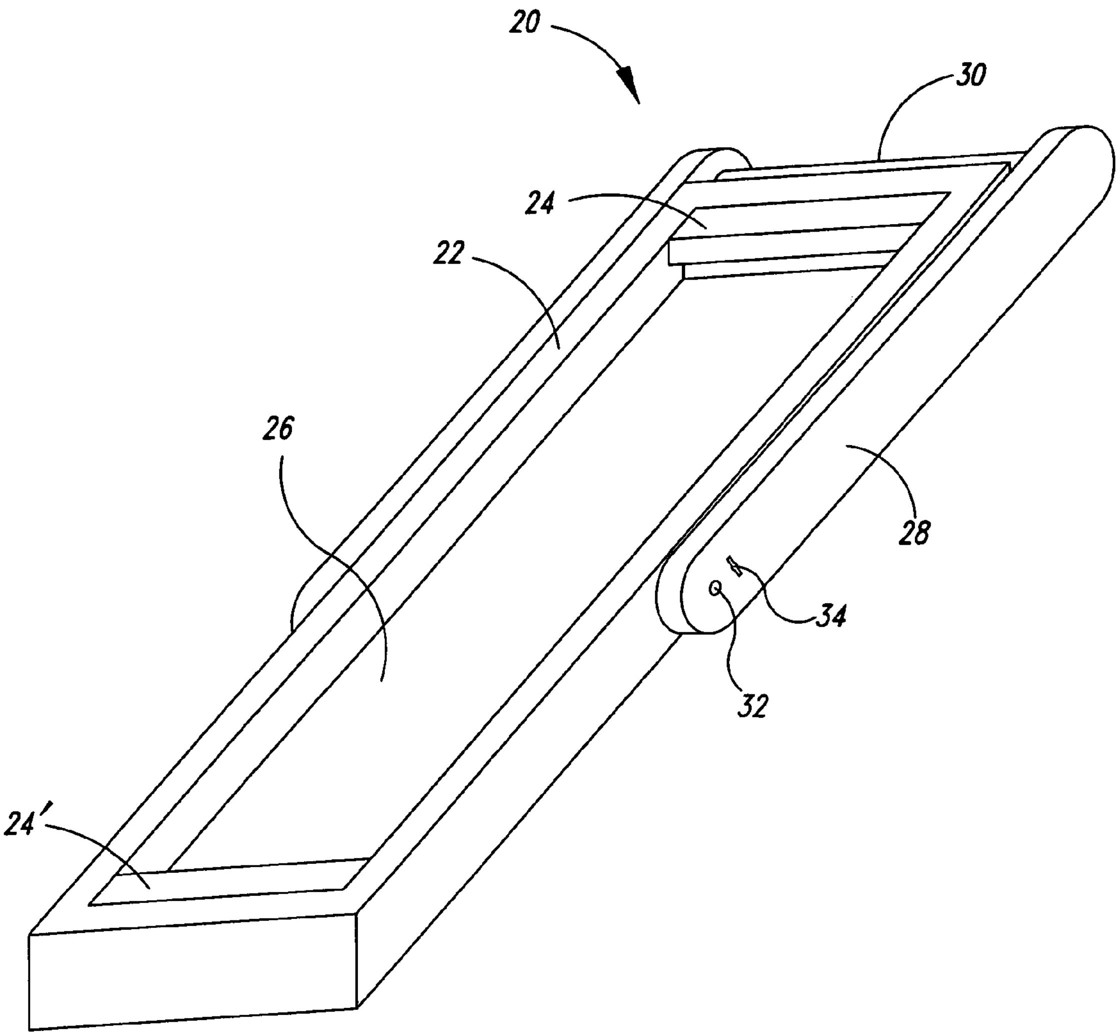
FIG. 10B shows the holder of FIG. 10A with the elongated support members folded up in parallel configuration with the holder for storage purposes.

In some alternative embodiments of the present invention, one or more support members 28 can also be connected to the holder 20, as illustrated in FIG. 10A. The support members 28 can have longitudinal axes and can be configured to be pivotable with respect to the holder 20. The support members 28 can be pivotable between a first position wherein the longitudinal axes of the support members are nonparallel to the longitudinal axis of the holder 20 (See FIG. 10A) and a second position wherein longitudinal axes of the support members are substantially parallel to a longitudinal axis of the holder (See FIG. 10B). In the first position the support members 28 can be used to elevate at least a portion of the holder 20 above a resting surface, with a bottom end of the support members 28 being in contact with the resting surface. In the second position, the support members 28 are folded up along side the holder 20 and can provide convenience for storage (See FIG. 10B).

Figure 13:
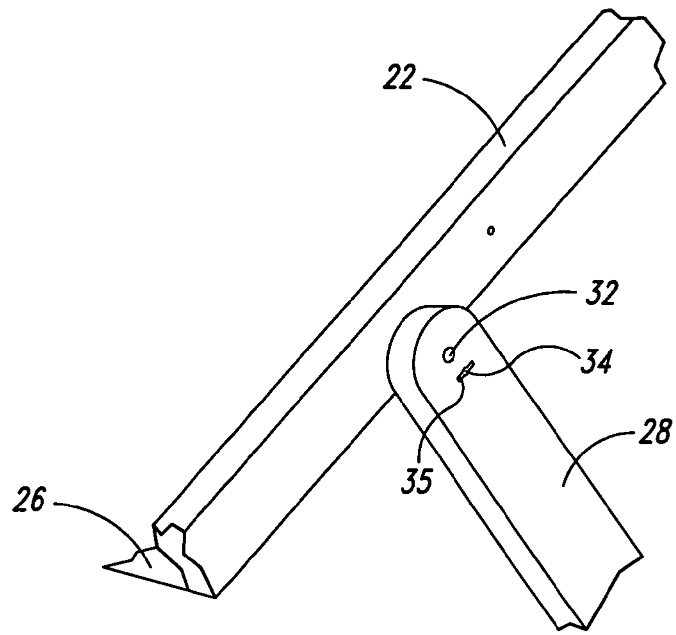
FIG. 13 is a detail perspective view of a side portion of the holder of FIG. 10A, showing an embodiment of a pivoting connection of the elongated support member and a locking element having finger grips.
Figure 14:
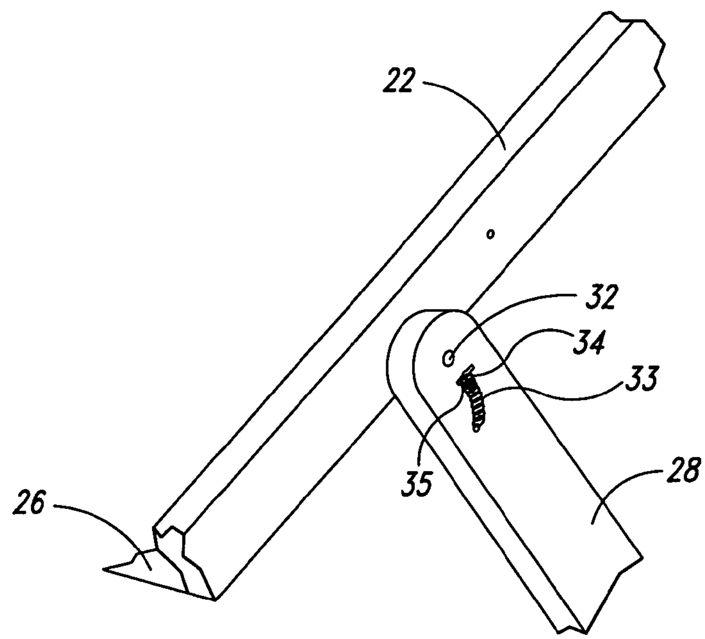
FIG. 14 is a detail perspective view of a side portion of the holder of FIG. 10A, showing an embodiment of a pivoting connection of the elongated support member and a locking element having finger grips and a cord.

Locking elements 34 can be provided on the holder 20 or support members 28 for locking the support members in either the first or second positions. As will be appreciated by one skilled in the art after reviewing this disclosure, a variety of known locking devices may be used in unique combination with the present invention as locking elements 34. For example, the locking elements can comprise threaded members or pins that are receivable by apertures in the support members 28 and holder 20. Also, the threaded members or pins can have finger grips 35 as illustrated in FIG. 13. In addition, where the locking element comprises a removable pin that can be inserted through apertures in the support member and holder 20 to lock the support member in a selectable position, a safety cord 33 is provided to prevent a user from misplacing the pin (See FIG. 14).

Figure 6:
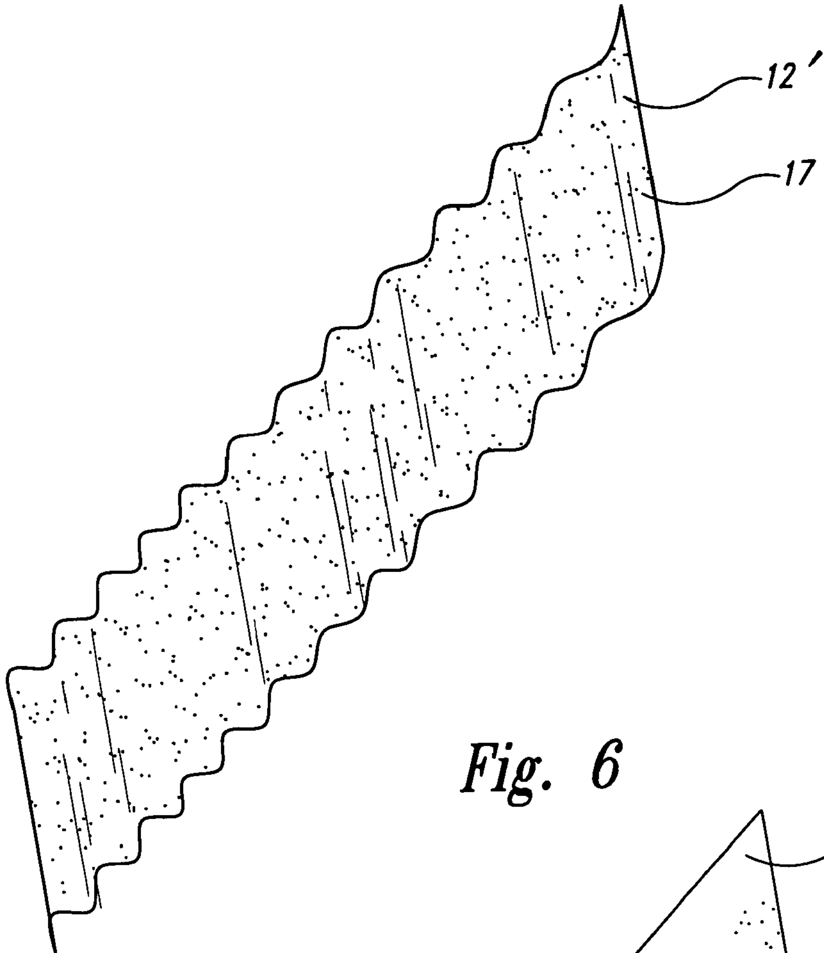
FIG. 6 is a perspective view of one of the embodiments of the rippled sheets of the present invention with an abrasive surface on at least part of the rippled sheet.
Figure 7:
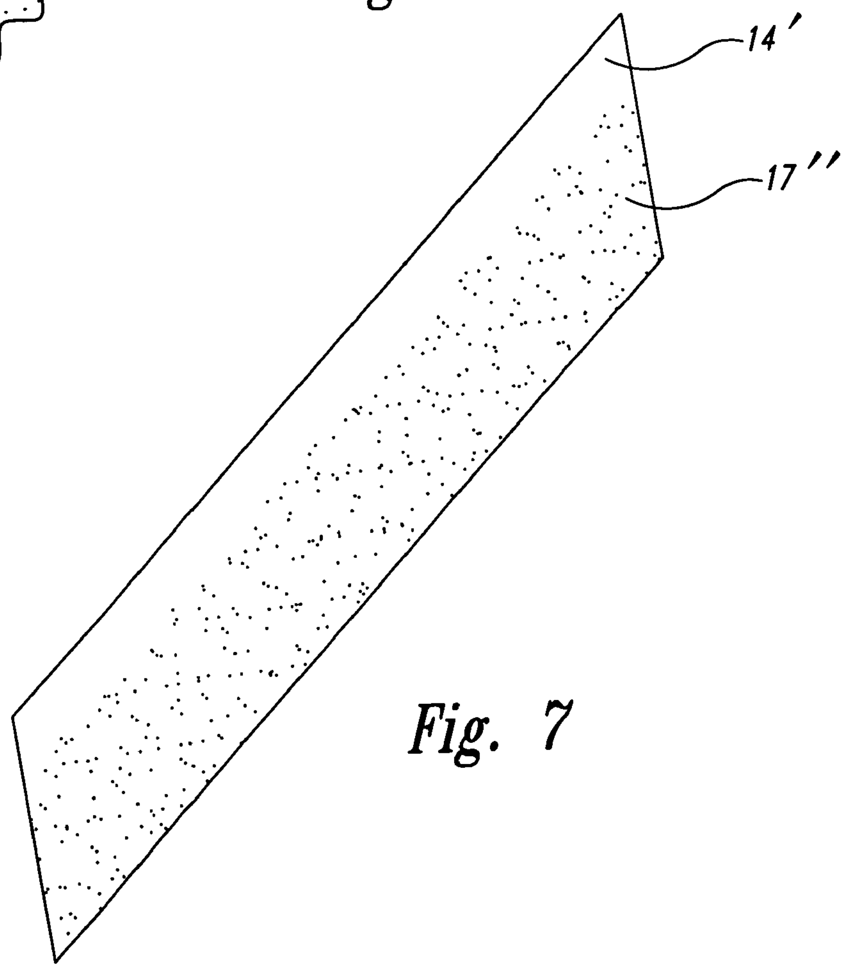
FIG. 7 is a perspective view of one of the liner wall embodiments of the present invention having an abrasive surface on at least part of the liner wall.

In other embodiments of the present invention, the internal faces of the corrugated strips 10 are partially or wholly abrasive. That is, the faces of the liner walls 14 and rippled sheets 12 of the corrugated strips 10 are abrasive. For example, FIG. 6 shows a rippled sheet 12' (or "fluting") with a partially abrasive face 17'. A top portion of the face 17' is nonabrasive in the illustrated embodiment, however, in other embodiments of this invention the entire face of the rippled sheet 12' is abrasive. Also, both faces of the rippled sheet 12 can be abrasive. FIG. 7 shows a liner wall 14' from a corrugated strip 10 used with embodiments of the present invention with a partially abrasive face 17". In the illustrated embodiment, a top portion of the liner wall face 17" is nonabrasive, whereas in some embodiments, the entire face is abrasive. Also, both faces of the liner wall 14 can be abrasive.

Figure 3:
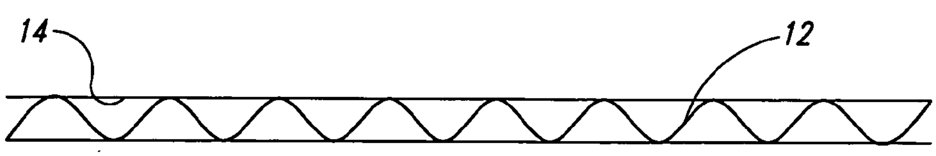
FIG. 3 is an overhead plan view of the rippled sheet of FIG. 2 (as viewed from line A—A) disposed between two liner walls.
Figure 18:
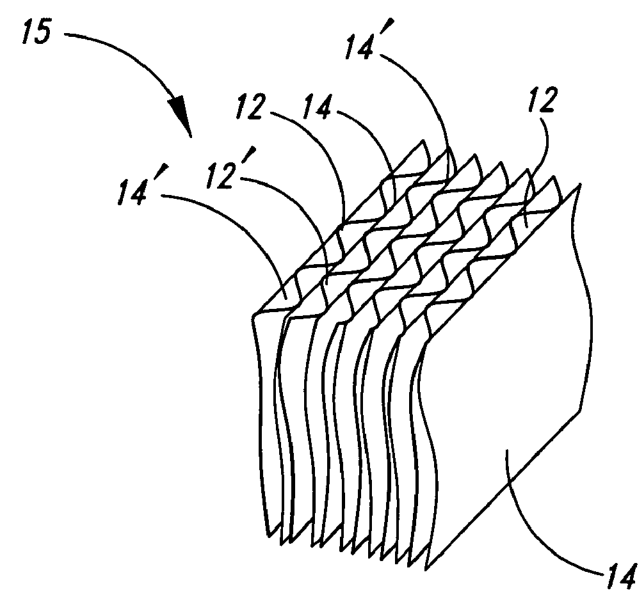
FIG. 18 is a perspective view of an embodiment of a corrugated bundle of the present invention having alternating abrasive and non-abrasive faces on the liner walls and rippled sheets.

All of the embodiments of the present invention can be implemented using abrasive liner walls 14' and abrasive rippled sheet 12', such as those in FIG. 6 and FIG. 7. Where these abrasive faces 17' and 17" are used, they can serve to dull or trim a cats claws when the cat (or animal) scratches the corrugated bundle 15. Therefore, some embodiments will use the abrasive faces 17' and 17" without the dulling element 16 while others can combine both the dulling element 16 and the abrasive faces 17', 17". Also, some embodiments combine a combination of abrasive faces 17' and 17" with non-abrasive faces (non-abrasive faces illustrated in FIG. 1, FIG. 2 and FIG. 3). That is, some embodiments of the corrugated bundles of the present invention alternate, or combine liner walls 14, 14' and rippled sheets 12, 12' with abrasive and non-abrasive faces in any pattern or arrangement desired. For example, an outside portion of corrugated bundle 15 could be comprised of liner walls 14' and rippled sheets 12' with abrasive faces, while a central portion of the corrugated bundle 15 could be comprised of liner walls 14 and rippled sheets 12 without abrasive faces. In other embodiments, the abrasive and non-abrasive faces can alternate in any arrangement or pattern. For example, as illustrated in FIG. 18, rippled sheets 12 and 12' alternate, and liner walls 14 and 14' alternate. These various arrangements can improve economics of the corrugated bundles eliminating the need to provide an abrasive surface on every face of the corrugated bundle 15.

Figure 15:
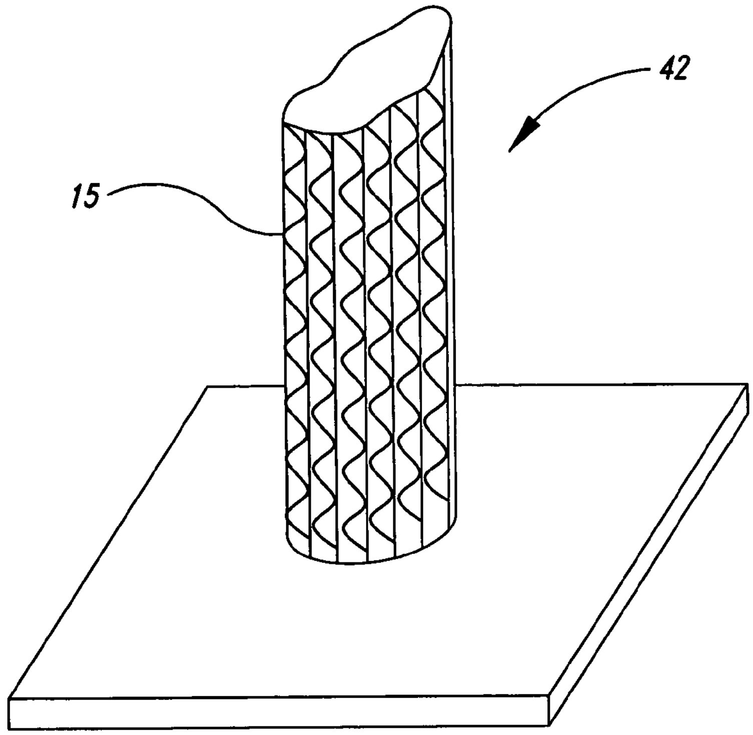
FIG. 15 is perspective view of an embodiment of a cylindrical scratch post of the present invention.
Figure 16:
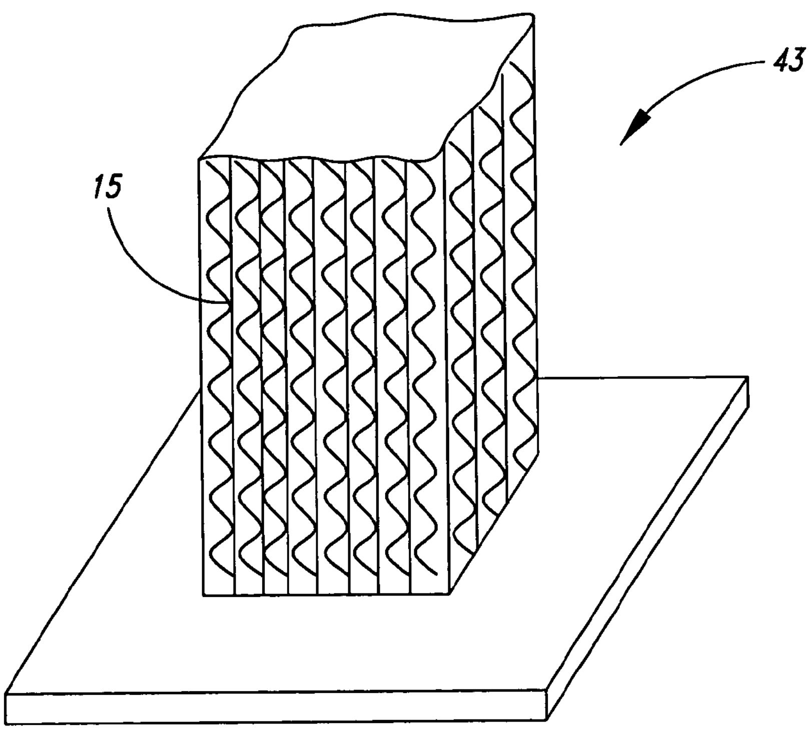
FIG. 16 is perspective view of an embodiment of a rectangular cross section scratch post of the present invention.
Figure 17:
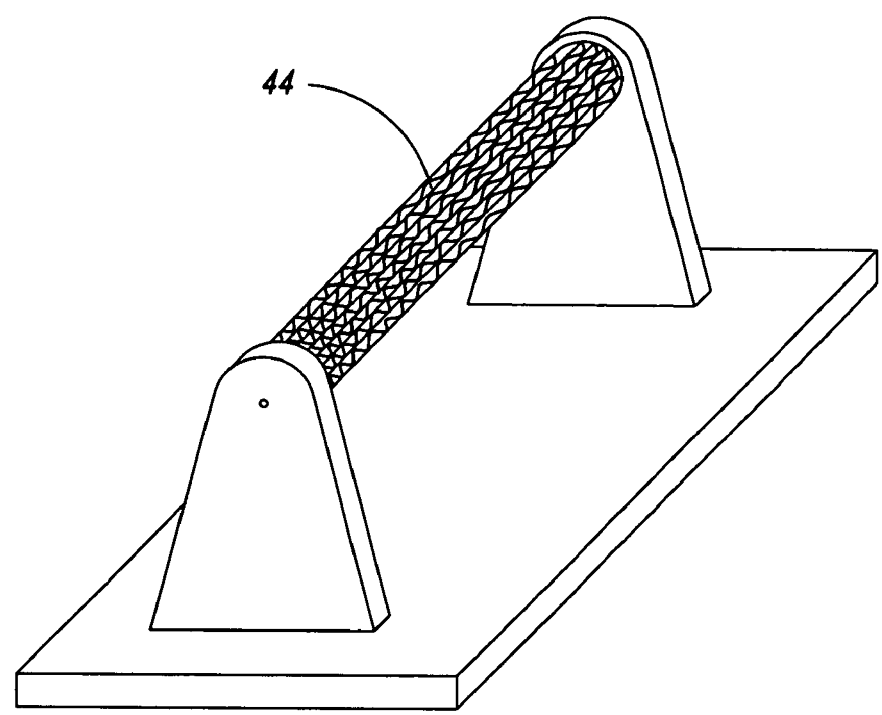
FIG. 17 is a perspective view of an embodiment of a holder of the present invention having a rotatable cylinder to which a corrugated bundle is coupled.

As will be appreciated by one skilled in the art after reviewing this disclosure, the corrugated assembly 19 or a corrugated bundle having abrasive faces 17' and 17", can be employed with numerous other holder embodiments. For example, the holder can be a cylindrical holder 42, such as that illustrated in FIG. 15. The holder can also be a rotatably mounted holder 44 capable of rotating about its longitudinal axis relative to a base member, as illustrated in FIG. 17. In yet another embodiment, the holder can be a traditional rectangular scratch post 43, overlaid with one of the corrugated assembly 19 (having the dulling element 16), or a corrugated bundle 15 with abrasive faces 17' and 17".

Figure 19:
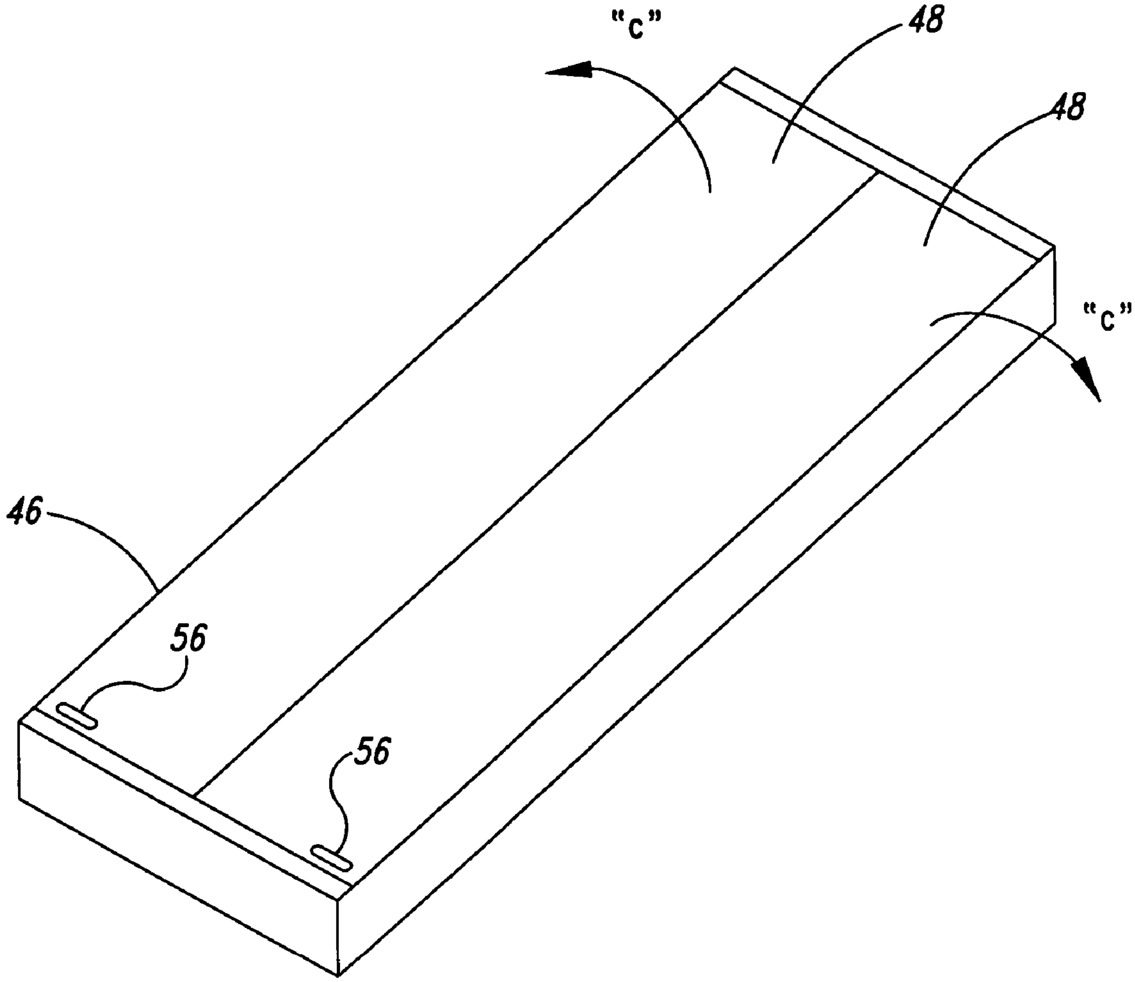
FIG. 19 is a perspective view of an embodiment of a cardboard holder of the present invention.
Figure 20:
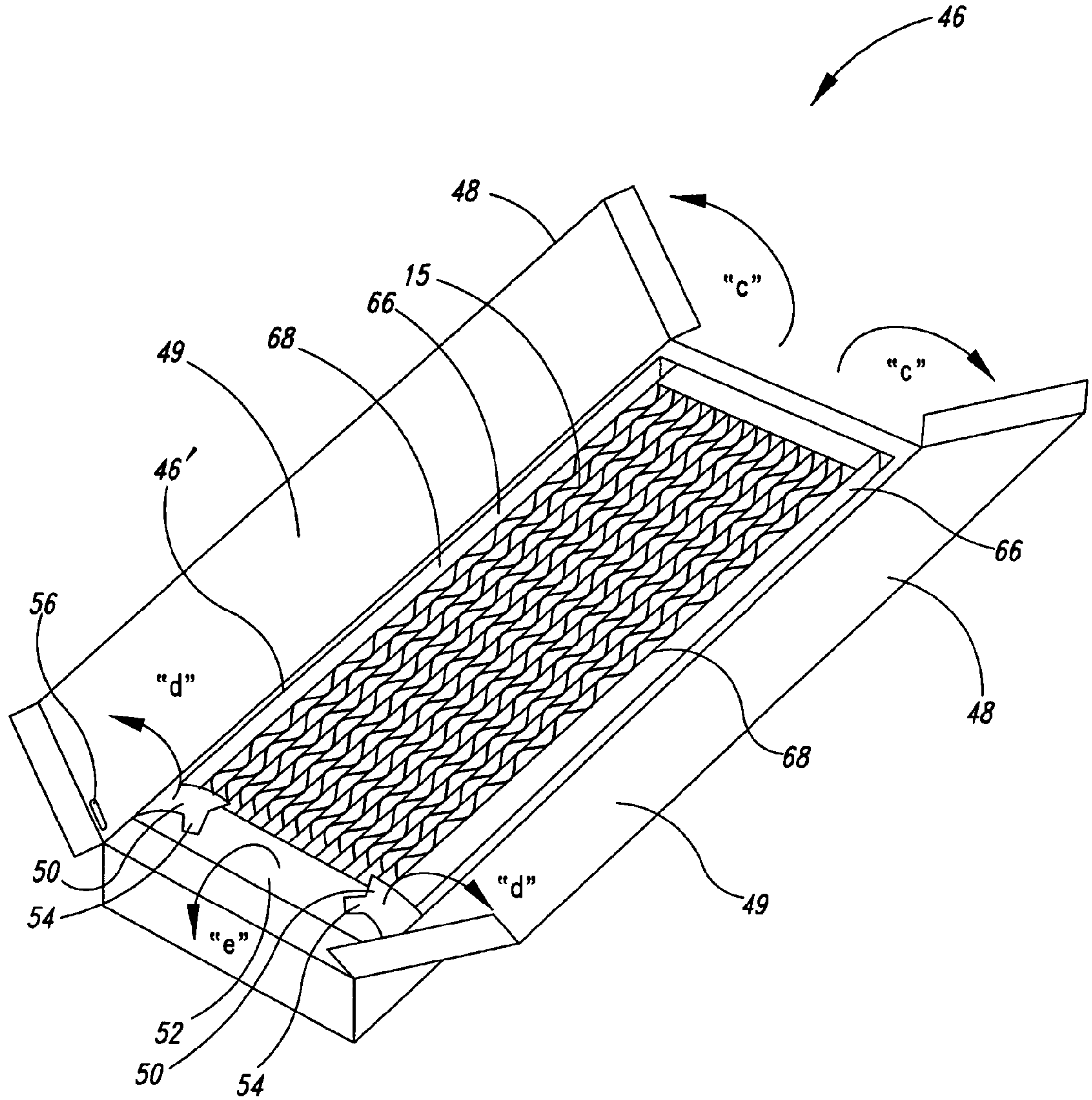
FIG. 20 is a perspective view of the cardboard holder of FIG. 19 with the cover flaps opened.

In another embodiment of the present invention, a corrugated bundle 15 can be contained within a holding section 46' of a cardboard holder 46, as seen in FIGS. 19 and 20. The cardboard holder 46 can have two cover flaps 48. The cover flaps 48 can be folded outward in the direction of arrows "c" to open the cover flaps 48 and to expose the corrugated bundle 15 inside the cardboard holder 46, as shown in FIG. 20.

Figure 21:
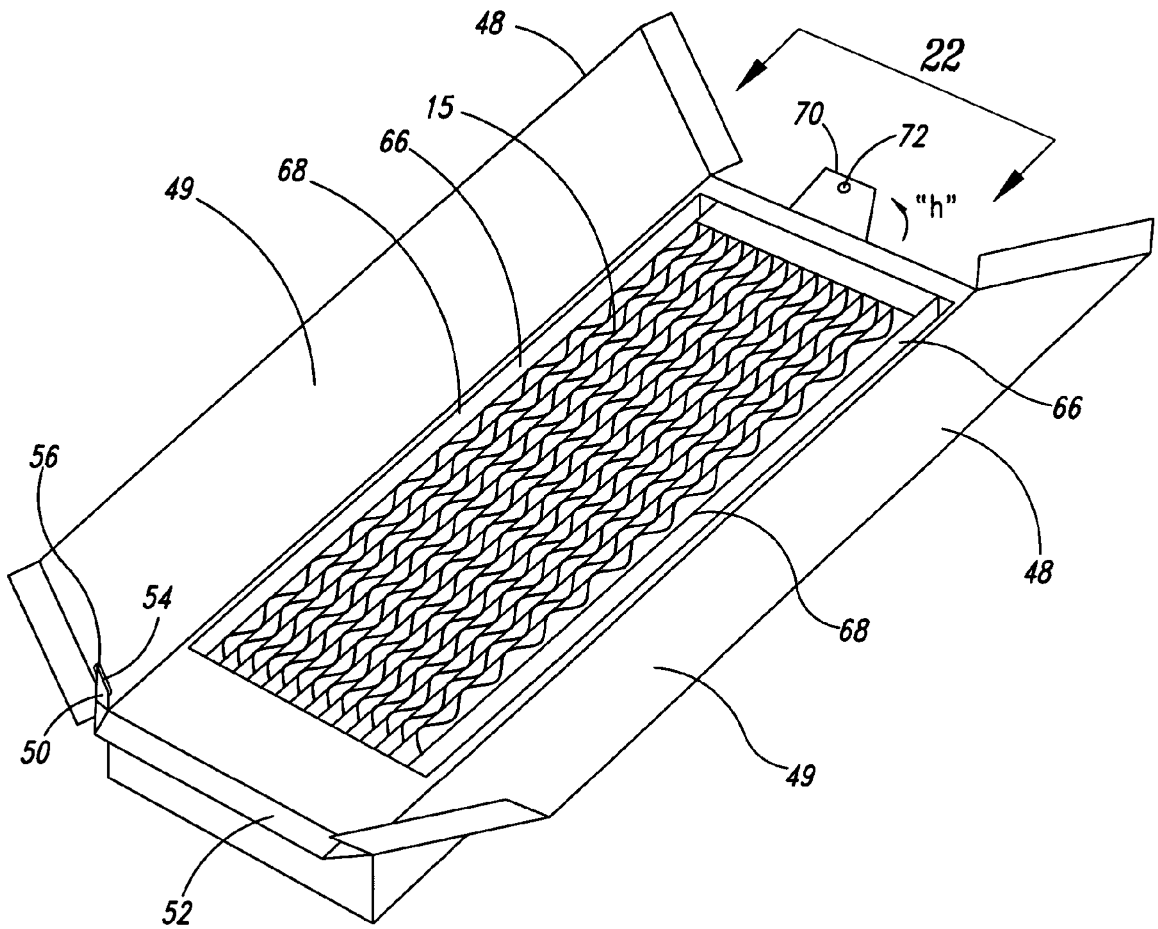
FIG. 21 is a perspective view of the cardboard holder of FIG. 20 with the extension flap and support flaps extended and in position to releasably lock the cover flaps in an open position.

As illustrated in FIG. 20, when the cover flaps 48 are opened, support flaps 50 positioned at an end portion of the cardboard holder 46 can be folded laterally outward in the directions of arrows "d." An extension flap 52, upon which the support flaps 50 are mounted, can be folded outward away from an end of the cardboard holder 46 in the direction of arrow "e." Insertion ends 54 of the support flaps 50 can then be snuggly inserted into receiving apertures 56 disposed on end portions of the cover flaps 48 to lock the cover flaps 48 in open positions, as shown in FIG. 21. It is also noted that the positions of the cover flaps 48 shown in FIG. 21 are elevated with portions of the cover flaps 48 being elevated higher than the corrugated bundle. More specifically, surfaces of the cover flaps can be positioned at about forty five (45) degrees with respect to a horizontal plane of the cardboard holder 46 as represented by angle "a" in FIG. 22. The cardboard holder 46 can also be configured so that the cover flaps 48 can be locked open in a variety of other angels, including, inter alia, between about twenty (20) degrees to about ninety (90) degrees with respect to the horizontal plane of the cardboard holder.

As best seen in FIGS. 20 and 21, catch channels 66, defined by cardboard walls 68, can be provided on either side of the corrugated bundle 15 within the cardboard holder 46. In the illustrated embodiments, the catch channels 66 are elongated rectangular channels with open tops and can catch refuse, including residue or pieces of cardboard when a cat scratches the corrugated bundle 15. That is, the corrugated bundle can comprise paper-type material or cardboard and when a cat scratches the corrugated bundle 15, pieces of cardboard and other residue can be ripped and propelled away from the corrugated bundle 15 by the scratching motion of the cat. The pieces can fall directly into the catch channels 66 or can impinge on the inside surfaces 49 of the cover flaps 48 or extension flap 52 and then fall or slide into the catch channels 66. This aids in maintaining cleanliness in areas around the cardboard holder 46, such as a carpeted area in a users' home.

Figure 23:
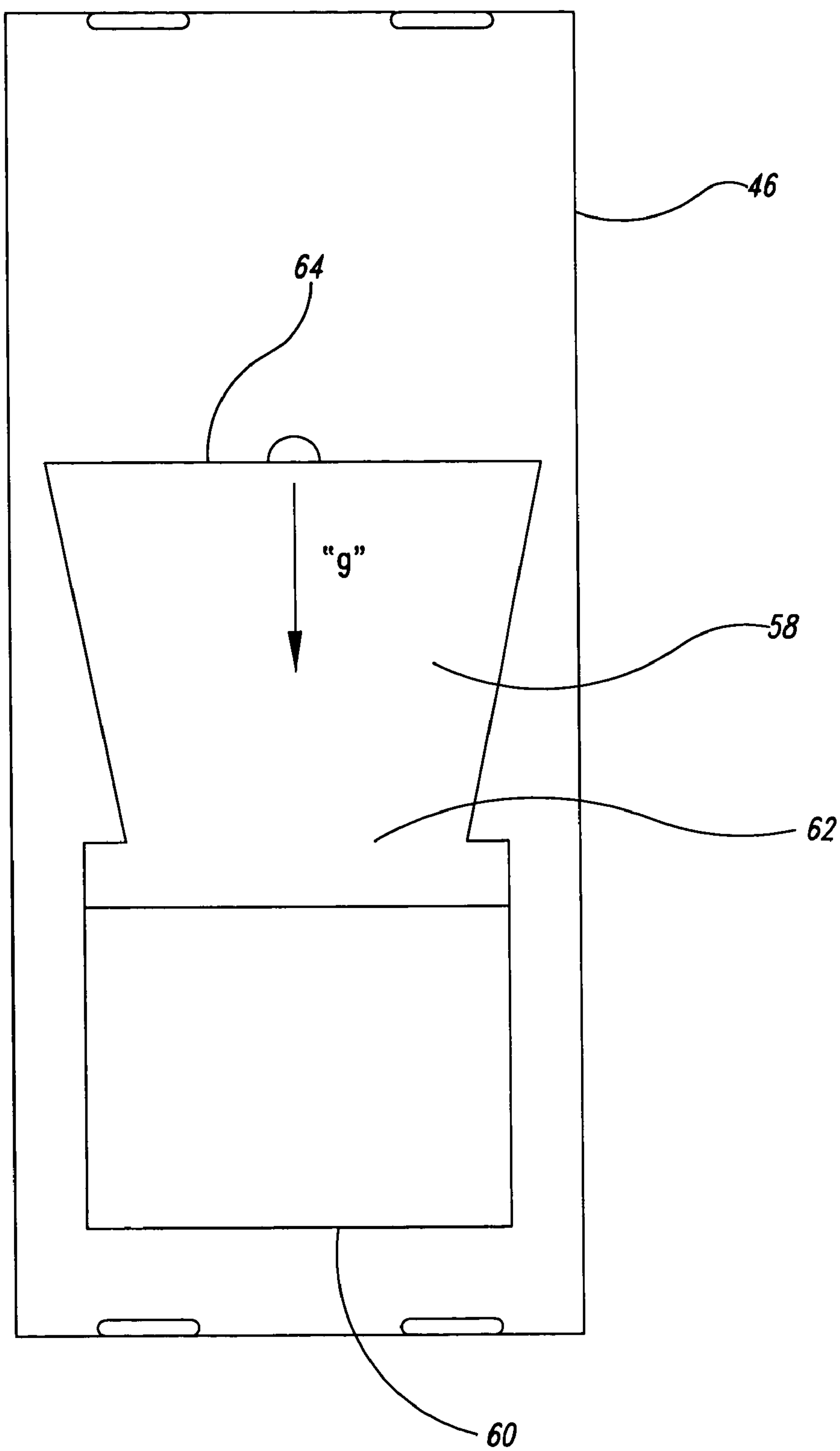
FIG. 23 is a bottom plan view showing a bottom surface of the cardboard holder of FIG. 19.
Figure 24:
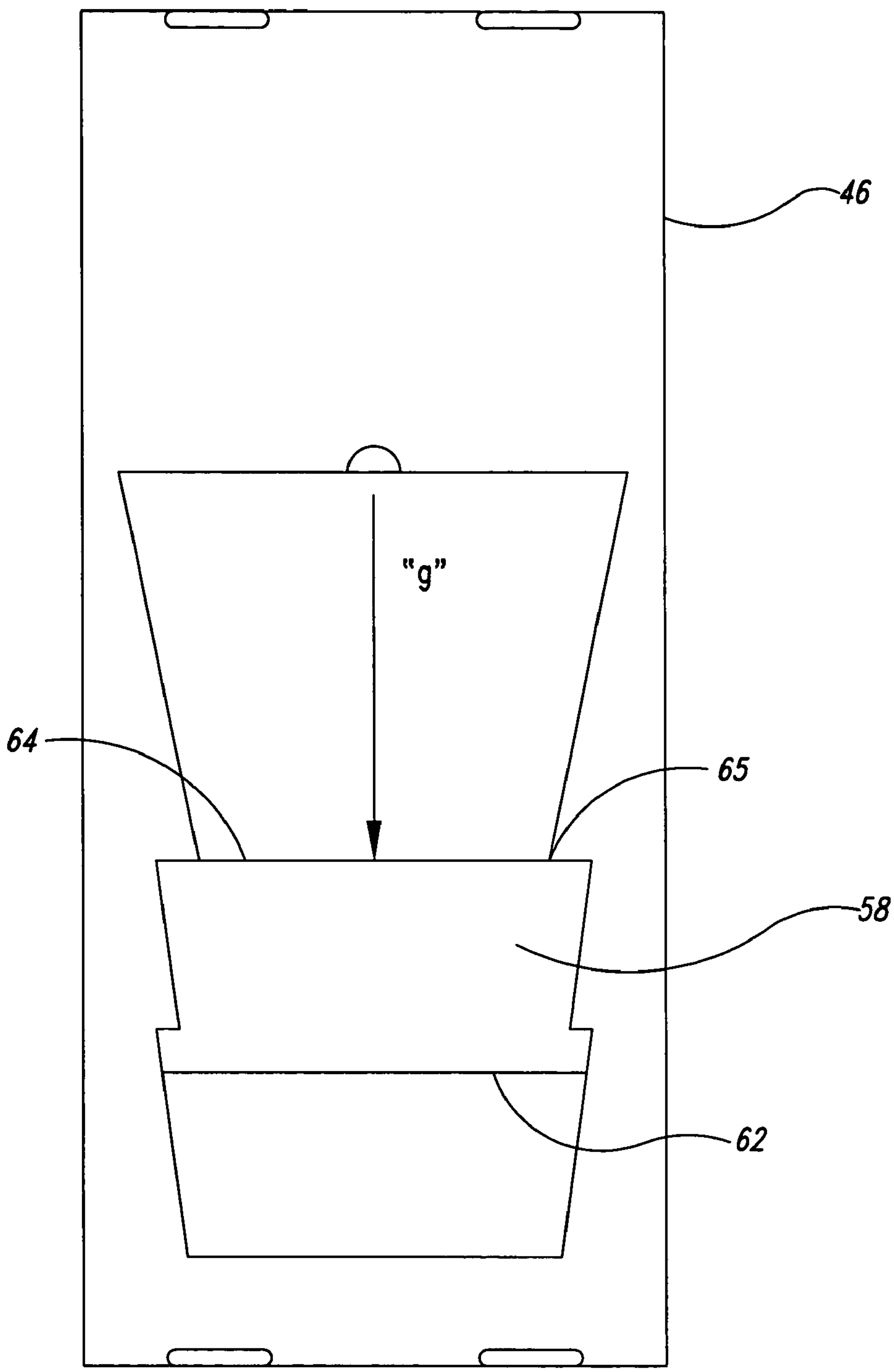
FIG. 24 is a bottom plan view showing a bottom surface of the cardboard holder of FIG. 19 with the bottom support being extended outward away from the bottom surface of the cardboard holder.
Figure 25:
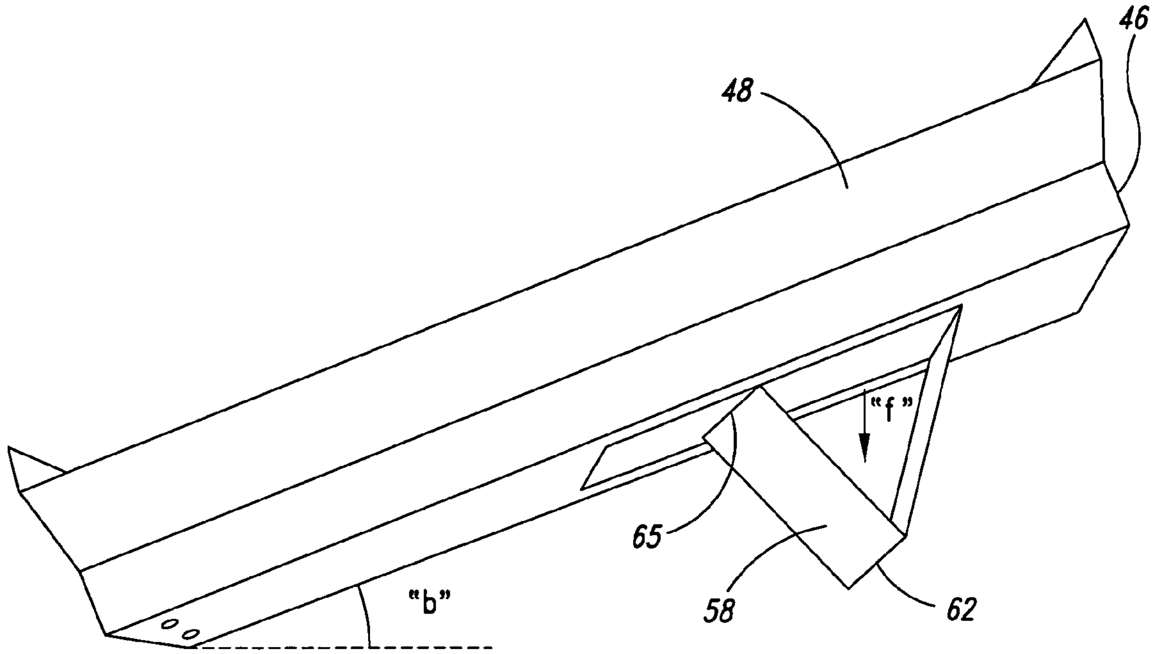
FIG. 25 is a perspective view of the cardboard holder of FIG. 19 as viewed form a position below the cardboard holder.

A bottom support 58 can be formed in a bottom layer of the cardboard holder 46. See FIG. 23 and FIG. 25. In some embodiments, the bottom support 58 is formed by being cut from an outside bottom cardboard layer of the cardboard holder 46 (such as in embodiments where the cardboard holder 46 has more than one bottom cardboard layer). An end portion 60 of the bottom support 58 is permanently attached to the cardboard holder 46, while the remainder of the bottom support 58 is separable from the cardboard holder 46. The bottom support 58 can be left flat against the bottom of the cardboard holder 46, such as during storage. When a user desires to use the bottom support 58, he or she can pull a middle portion 62 of the bottom support 58 downward and away from the bottom of the cardboard holder 46, as illustrated by arrow "f" in FIG. 25, while simultaneously pulling an end portion 64 of the bottom support 58 back, as illustrated by arrow "g" in FIGS. 24 and 25. As will be appreciated by one skilled in the art after reviewing the present disclosure, a variety of configurations are available to lock the support member 58 in place in the positions shown in FIG. 23 or FIG. 25. For example, an end catch 65 of the bottom support 58 can be provided to be receivable within a notch in the bottom of the cardboard holder 46 to lock the bottom support 58 in the position of FIG. 25. The cardboard holder 46 can then be left to rest on a surface with one end elevated above the resting surface by the bottom support 58.

The end of the cardboard holder 46 can be raised at a variety of angles depending on what is desired by the user. The bottom support 58 can be configured to provide an angle between a resting surface and the cardboard holder 46, as illustrated by angle "B" in FIG. 25. Angle "B" can be anywhere between 5 degrees and 60 degrees or more. Angle "B" can also be less than 5 degrees or more than 60 degrees. In some embodiments, angle "B" is about 45 degrees.

Figure 22:
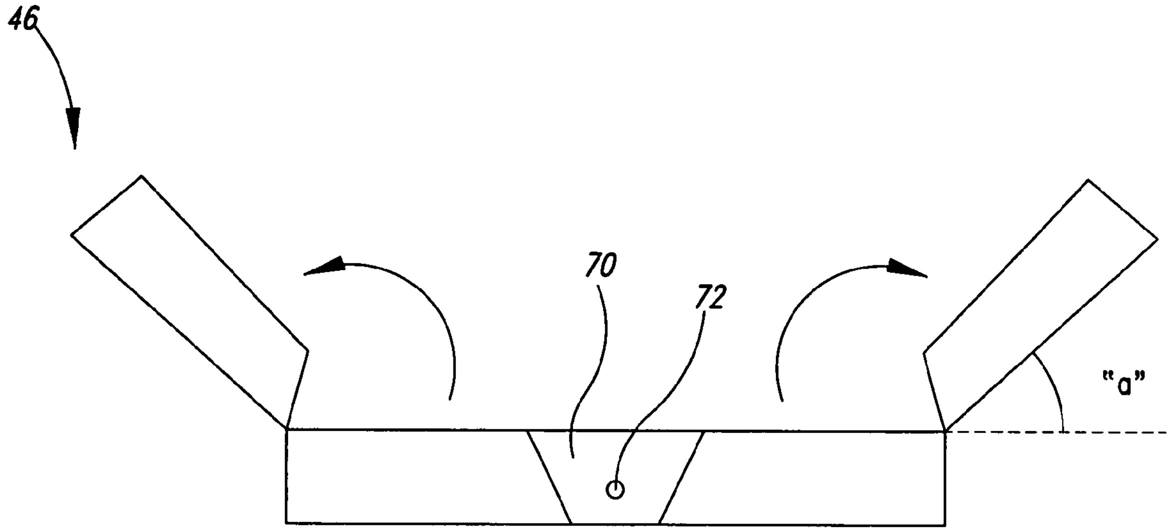
FIG. 22 is an end view of the cardboard holder of FIG. 21 as viewed from line 22 of FIG. 21.

As best seen in FIG. 21 and FIG. 22, a hanging flap 70 can be formed at an end portion of the cardboard holder 46. The hanging flap 70 can have an aperture 72 for hanging an end portion of the cardboard holder 46 from a wall or other structure. For example, a nail can be placed in a wall and an end of the cardboard holder 46 can be raised by hanging the hanging flap 70 on the nail through the aperture 72. The hanging flap 70 can be used to elevate an end portion of the cardboard holder 46 in lieu of the bottom support 58, or both the bottom support 58 and hanging flap 70 can be used simultaneously to elevate an end portion of the cardboard holder 46.

As can be seen in FIG. 22, depicting an end view of the cardboard holder 46, the hanging flap 70, like the bottom support 58, can be cut from an outer layer of cardboard of the cardboard holder 46. The hanging flap 70 can be left flat against the cardboard holder 46, as depicted in FIG. 22, or can be folded out and upward (arrow "h") for hanging, as best seen in FIG. 21.

Some advantages of the embodiments illustrated in FIGS. 19 through 25, include, but are not limited to (1) the cover flaps 48 can serve as catch walls to direct residue to the catch channels 66; (2) each of the cover flaps 48, extension flap 52, support flaps 50, hanging flap 70, and bottom support 58 can be foldable to a compact form as shown in FIG. 19; (3) the inside 49 surfaces of the cover flaps 48 can be marked with a brand or logo such that others can see a brand of the product during use (this is contrasted with some other cardboard scratch devices currently available where a cover is removed and there is no sufficient surface area on the rest of the device suitable for displaying brands when the device is in use); (4) catch channels 66 can be provided to catch refuse such as pieces of residue and cardboard scratched away from the corrugated bundle 15; (5) a bottom support 58 and hanging flap 70 can be provided to allow the cardboard holder 46 to be raised at one end at a variety of angles for an animal to scratch.

Although the cardboard holder 46 has been disclosed in the context of being comprised of cardboard, the materials of construction are not intended to be limiting or restrictive. As one skilled in the art will appreciate after reviewing this disclosure, the cardboard holder 46, or holder, can be constructed out of various materials in various embodiments, such as, inter alia, plastic or wood.

Figure 26:
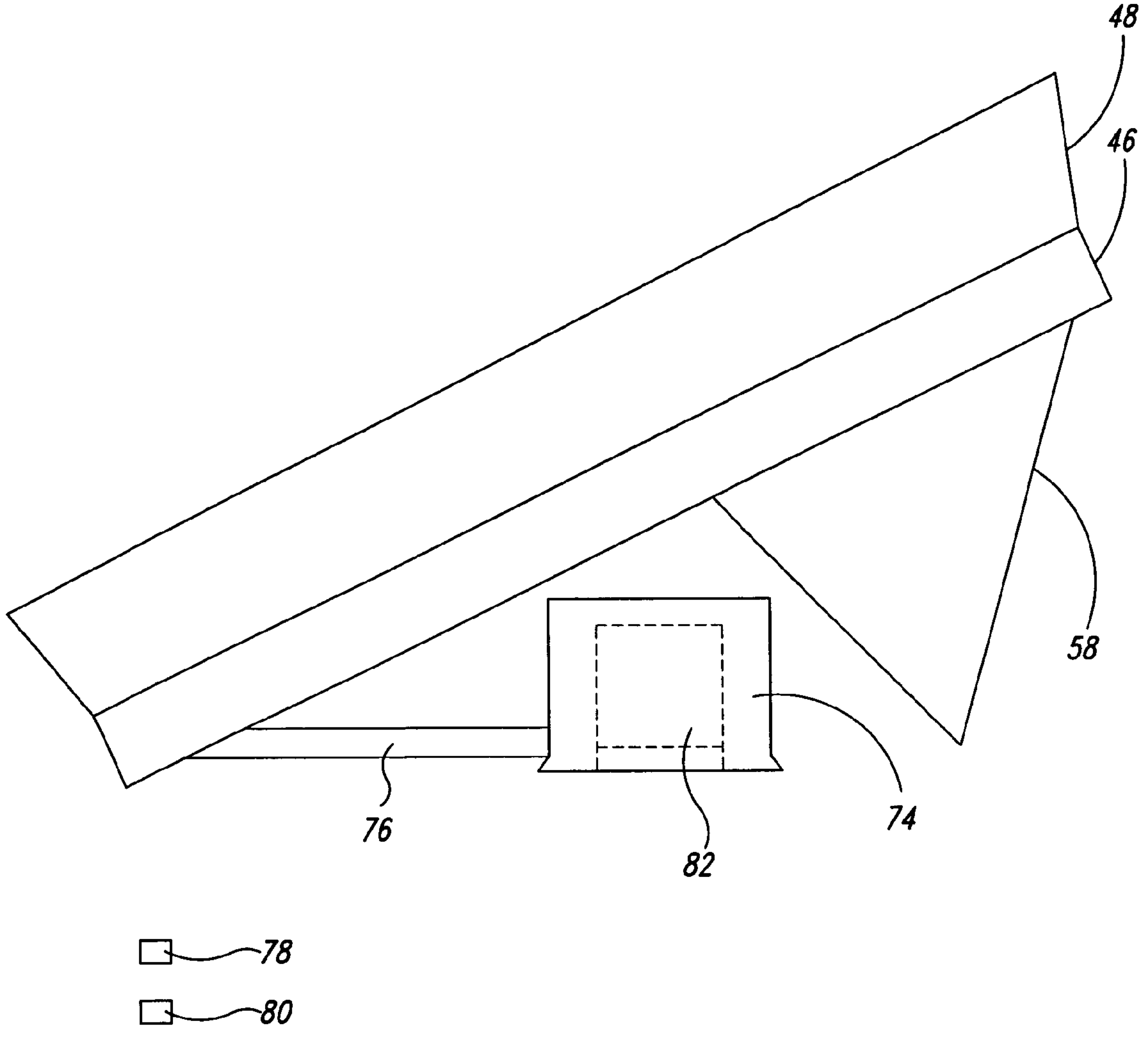
FIG. 26 is a simplified diagram of an embodiment of the cardboard holder having a vacuum system with a sensor and a processor unit.

In another embodiment of the present invention, a vacuum 74 is provided for removing refuse (i.e. pieces or cardboard or other residue) from the catch channels 66. See FIG. 26. The vacuum 74 can be disposed below the cardboard holder 46, as illustrated, or in other locations adjacent or beneath the cardboard holder. In other embodiments, the vacuum is remotely located. A vacuum line 76, such as a tube or plastic pipe, or any suitable conduit is coupled to the vacuum 74 and to at least one of the catch channels 66 such that refuse can be vacuumed form the catch channels 66. As will be appreciated by one skilled in the art after reviewing this disclosure, the vacuum 74 can be coupled to a variety of locations to be in communication with the catch channels 66 so that refuse can be vacuumed from the catch channels 66.

Some embodiments also include an interchangeable vacuum bag.82. The interchangeable vacuum bag 82 can be configured to be releasably coupled to the vacuum 74. Refuse from the catch channels 66 can be vacuumed directly into the vacuum bag 82. When the vacuum bag 82 is full, it can be changed out with a new vacuum bag 82. In other embodiments, the vacuum bag 82 can undergo several cycles of use before being changed out with a new vacuum bag.

A motion sensor 78 can also be provided and coupled to the vacuum 74. For example, the motion sensor 78 can be coupled to a processor unit 80 configured to trigger operation of the vacuum only after a cat has scratched the corrugated bundle 15. As will be appreciated by one skilled in the art after reviewing the present disclosure, the sensor 78 can be any of variety of motion detection devices, such as, but not limited to, those with either optical or displacement sensing capabilities, some of which are commonly available. The sensor 78 may be placed at any suitable location proximate or within the cardboard holder 46 and corrugated bundle 15. When the cat's motion stops, the processing unit 80 can send a signal to provide power to the vacuum 74 to vacuum the catch channels 66.

Although specific embodiments and examples of the invention have been described supra for illustrative purposes, various equivalent modifications can be made without departing from the spirit and scope of the invention, as will be recognized by those skilled in the relevant art after reviewing the present disclosure. The various embodiments described can be combined to provide further embodiments. The described devices and methods can omit some elements or acts, can add other elements or acts, or can combine the elements or execute the acts in a different order than that illustrated, to achieve various advantages of the invention. These and other changes can be made to the invention in light of the above detailed description.

In general, in the following claims, the terms used should not be construed to limit the invention to the specific embodiments disclosed in the specification. Accordingly, the invention is not limited by the disclosure, but instead its scope is determined entirely by the following claims.

What is claimed is:

1. An apparatus for dulling animal claws comprising:

a corrugated bundle having at least one liner wall and at least one rippled sheet coupled thereto; and an abrasive surface formed on a face of the liner wall.

2. The apparatus of claim 1 wherein the abrasive surface is on the face of the at least one rippled sheet.

3. The apparatus of claim 1 wherein the abrasive surface is on the dulling element coupled to the corrugated bundle.

4. The apparatus of claim 1 further comprising a holder configured to receive the corrugated bundle, said holder having at least one cover flap that can be locked in an elevated position such that a portion of the cover flap extends upwardly to a higher elevation than the corrugated bundle.

5. The apparatus of claim 4 wherein when the cover flap is locked in the elevated position, a surface of the cover flap forms an angle with a lateral plane of the cardboard holder between about 20 degrees to about 80 degrees.

6. The apparatus of claim 4 further comprising at least one support flap formed on the holder, said support flap being configured to be insertable within an aperture of the cover flap to aid in locking the cover flap in said elevated position.

7. The apparatus of claim 4 wherein the holder comprises a catch channel positioned proximate said cover flap for catching pieces of the corrugated bundle that can be scratched off by an animal.

8. The apparatus of claim 1 further comprising a holder configured to receive the corrugated bundle, said holder having at least one support member for raising an end of the holder such that when the holder is rested on a surface, said end of the holder is raised above another end of the holder.

9. The apparatus of claim 8 wherein the support member is a flap having an aperture through which a protrusion from a wall or other rising structure can be extended to hang the flap on the protrusion.

10. The apparatus of claim 8 wherein the support member is selectively positionable to extend downward from the holder.

11. A cardboard scratcher assembly for a cat comprising:

a cardboard scratcher;

an abrasive surface disposed within the cardboard scratcher on a face of at least one rippled sheet of the cardboard scratcher; and a holder for retaining the cardboard scratcher, said holder having a support member for raising a portion of the holder above a resting surface of the holder.

12. The assembly of claim 11 wherein said holder has at least one cover flap for covering the cardboard scratcher during storage and wherein the cover flap can be opened and locked in an elevated position such that a portion of the flap is raised to a higher elevation than the cardboard scratcher for blocking pieces of the cardboard scratcher from being propelled away from the holder by a cat.

13. The assembly of claim 11 having at least one support member for raising an end of the holder above a resting surface.

14. A method of dulling cat claws comprising:

providing a cardboard scratcher;

providing an abrasive surface on a face of a liner wall within the cardboard scratcher;

providing a holder for retaining the cardboard scratcher, said holder having a support member for raising an end of the holder above a surface; and allowing a cat to scratch said cardboard scratcher.

15. The method of claim 14 further comprising placing an organic substance with said cardboard scratcher to induce the cat to scratch the cardboard scratcher.

16. The method of claim 14 wherein the abrasive surface is formed on a face of a rippled sheet within the cardboard scratcher.

17. The method of claim 14 wherein said holder also has cover flaps that are lockable in a raised position such that a portion of the flaps are elevated above the cardboard scratcher to help block cardboard pieces from being propelled away from the holder by a cat scratching the cardboard scratcher.

18. The method of claim 17 wherein said holder also comprises catch channels from collecting pieces of cardboard scratched away from the cardboard scratcher by the cat.

* * * * *